United States Patent

[11] 3,581,087

| [72] | Inventors | Joris M. Brinkerhoff<br>Arlington;<br>Jean Hunerwadel, Hingham; Francis B.<br>Sellers, Sudbury, all of, Mass. |
|---|---|---|
| [21] | Appl. No. | 770,615 |
| [22] | Filed | Oct. 25, 1968 |
| [45] | Patented | May 25, 1971 |
| [73] | Assignee | Panametrics, Inc.<br>Waltham, Mass. |

[54] X-RAY FLUORESCENCE MEASURING SYSTEM EMPLOYING BALANCED X-RAY FILTERS AND CIRCUIT MEANS TO VARY THE EFFECTIVE RELATIVE TRANSMISSION THEREOF
4 Claims, 5 Drawing Figs.

| [52] | U.S. Cl. | 250/51.5,<br>250/83.3, 250/86 |
|---|---|---|
| [51] | Int. Cl. | H05g 3/00,<br>G01m 23/22 |
| [50] | Field of Search | 250/51.5,<br>83.3 (D) |

[56] References Cited
UNITED STATES PATENTS

| 3,012,140 | 12/1961 | Pellissier et al. | 250/51.5 |
| 3,030,512 | 4/1962 | Harker | 250/51.5 |
| 3,100,261 | 8/1963 | Bigelow | 250/51.5 |
| 3,467,824 | 9/1969 | Boyce et al. | 250/51.5 |

*Primary Examiner*—James W. Lawrence
*Assistant Examiner*—C. E. Church
*Attorney*—Kenway, Jenney & Hildreth

ABSTRACT: An X-ray fluorescence analysis system for measuring the amount of a specific element in a matrix containing variable amounts of other elements. The system employs a pair of balanced filters and a detector and counting apparatus. One filter has an absorption edge above the characteristic X-ray energy of the specific element and the other has its absorption edge below that energy. The apparatus is arranged so that with one filter in place the number of rays received by the detector for a time $\tau$ is accumulated and with the other filter in place the number of rays detected for a fraction $F\tau$ of that time is subtracted from the first number, the difference representing the quantity of specific element present.

INVENTOR
JORIS M. BRINKERHOFF
JEAN L. HUNERWADEL
FRANCIS B. SELLERS

INVENTOR
JORIS M. BRINKERHOFF
JEAN L. HUNERWADEL
FRANCIS B. SELLERS
BY
Kenway, Jenney & Hildreth
ATTORNEYS

X-RAY FLUORESCENCE MEASURING SYSTEM EMPLOYING BALANCED X-RAY FILTERS AND CIRCUIT MEANS TO VARY THE EFFECTIVE RELATIVE TRANSMISSION THEREOF

FIELD OF THE INVENTION

This invention relates in general to X-ray fluorescence analysis and more particularly to a system for measuring the quantity of a specific element contained in a matrix of other materials, where one or more of the other elements in the matrix may be varying.

BACKGROUND OF THE INVENTION

In X-ray fluorescence analysis, quantitative determinations of the elemental composition of the material are made by bombarding the material with radiation, typically X-rays or high energy electrons having a quantum energy greater than the absorption edge of the element to be measured, and detecting the primary characteristic K or L X-rays emitted by the element. A variety of techniques have been employed to isolate the characteristic X-rays emitted by the specific element being measured from the general background of X-rays excited in the matrix material by the bombardment.

One general technique involves the use of detectors producing output signals having an amplitude proportional to the energy of the radiation incident on the detector. The output signals are then applied to electronic systems which analyze the pulse amplitude and thereby permit isolation of X-rays characterized by a particular energy. Such detectors include proportional counters and scintillation counters used under particular circumstances. This approach then involves relatively sophisticated and expensive detection systems, and additionally, is somewhat limited in resolution when the energy of X-rays emitted from the background materials in the matrix does not differ widely from the energy of the specific element being measured.

In another approach, selected filters are interposed between the sample material and the detector, so that only radiation transmitted through the filter reaches the detector. In this "balanced filter" approach, a measurement of radiation is first made using a filter having an absorption edge at an energy greater than the energy of the characteristic X-ray being emitted by the specific element to be measured. A second measurement is then made using a filter having an absorption edge at an energy below the characteristic energy of the specific element. The difference between these measurements is taken as a measurement of the quantity of the specific element in the matrix. Typically, if zinc were the specific element to be measured, a filter of copper would be employed in the first measurement and a filter of nickel in the second. Generally the absorption coefficients of these two filters will be closely matched except for the energy region between their absorption edges, which corresponds to the energy region where the characteristic X-rays from zinc lie. Thus if the thicknesses of the filters are properly selected, the difference between the number of rays detected using the first filter and the number of rays detected using the second filter represents a substantial response to the quantity of zinc and, at the same time, a fairly small response for certain other elements.

The problem becomes somewhat more complex when many elemental constituents of the total mixture are variable simultaneously. For example, if the quantity of the element zinc in a background matrix of aluminum is to be measured, and the filters are selected so that the difference between the number of rays measured with one filter and with the other is indicative of variation in the concentration of zinc, and at the same time relatively insensitive to copper variations, the addition of a variable amount of iron in the matrix will result in a variation in the number of rays detected when measuring with one filter in contrast to measuring with the other. In the past, one method of compensating for such effects has been simply to attempt to prepare filters which are relatively independent of variations in the concentration of the particular background elements in the matrix. The approach has, however, been difficult and has involved the preparation and availability of a number of filters for each set of specific elements in the matrix whose effects of variation it was desired to minimize.

BRIEF SUMMARY OF THE INVENTION

In the present invention, balanced filters are used in making a quantitative determination of the amount of a specific element in a mixture which may contain varying amounts of other elements. The filters selected have absorption edges just above and below the energy of the primary ray from the specific element being measured. The thickness of these filter elements is selected to generally minimize any variation in the number of rays detected as a result of characteristic X-rays from one or more elements whose concentration in the background matrix material may be varying. The output pulses from the detector are applied to an electronic counting system in such a way that pulses representing rays received by the detector while the first filter is in place drive the counter in one direction so that the total number of counts accumulated represents the pulses received in this portion of the measurement. When the second filter is inserted in place of the first, the output from the detector is coupled to the counting system in such a way that the number of pulses now accumulated is subtracted from the first. The measurement of pulses while the first filter is in place is made for a selected time, $\tau$ and the counting system is arranged so that the time for the second measurement with the other filter in place, may be selected to be a particular fraction, F, of the time $\tau$. It has been discovered that by varying this fraction appropriately, the sensitivity of the system to variations in the other elements in the composition of the background matrix may be minimized, thereby providing for an efficient measurement with one pair of filters, despite variations in the composition of the background matrix.

The system may also operate in an arrangement employing two detectors, each detector having one of the filters interposed between it and the radiation from the sample at all times. The outputs from the two detectors are then weighted and the difference between the weighted outputs from the detectors is taken as a measure of the quantity of the specific element present. The weighting is done in such a fashion that the weighted output signal from one detector represents the number of rays passed through its associated filter for a specific time $\tau$ and the weighted output signal from the other detector represents the number of rays received through its associated filter for a time $F\tau$. A similar effect may also be accomplished by taking a weighted difference between two unweighted signals.

DESCRIPTION OF A PREFERRED EMBODIMENT

Figure 1:
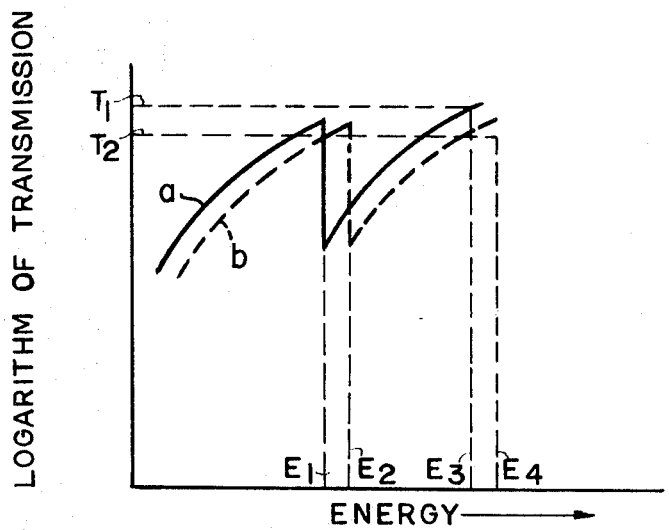
FIG. 1 is an illustration in graphical form of the variation in the logarithm of the absorption characteristic for a pair of filters as a function of energy of the radiation incident upon the filters.

With reference to FIG. 1 there is illustrated in graphical form the transmission characteristics of a pair of balanced filters. Curve $a$ represents the transmission characteristic of a filter, $a$, having an absorption edge at $E_1$, whereas curve $b$ represents the transmission characteristic of a filter, $b$, having an absorption edge at $E_2$. If these filters are used to measure radiation having a quantum energy between $E_1$ and $E_2$, then the difference between the number of pulses transmitted through the filter and the number transmitted through the $b$ filter is a direct representation of the number of rays incident upon the filter and lying within this energy band.

If the radiation incident on the filter also includes a variable quantity of radiation in the energy band between values $E_3$ and $E_4$, then the difference between the number of rays transmitted through the filter $a$ and those transmitted through the filter $b$ will also represent variations in the number of incident rays in this energy band.

The ratio of the time of measurement of the radiation transmitted through filter $b$, and the time of measurement of radiation filtered through filter $a$, is adjusted to be the same as the ratio of the values $T_1$ and $T_2$ on the transmission curves, the values $T_1$ and $T_2$ being the value of transmission for the respective filters in the center of the energy band $E_3-E_4$. Under these circumstances variation in the amount of rays of energy between $E_3$ and $E_4$ will not result in variation in the difference between the number of pulses recorded for measurements with filter $a$ and measurements with filter $b$. pulses recorded for measurements with filter $a$ and measurements with filter $b$.

Figure 2:
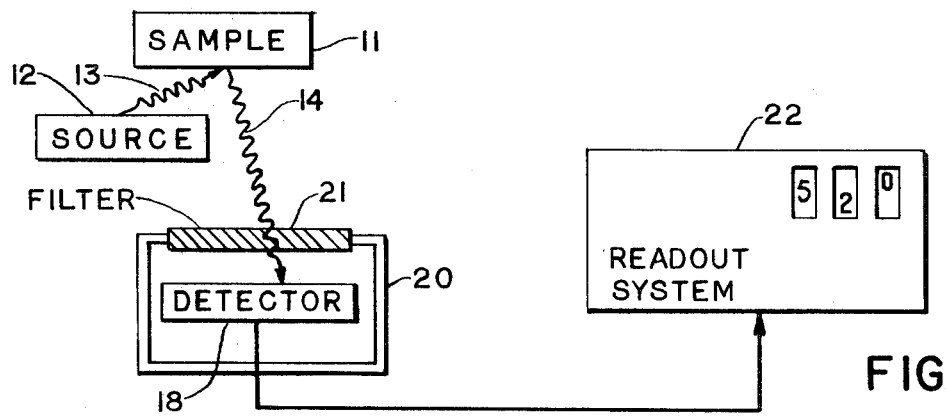
FIG. 2 is an illustration in block diagrammatic form of a measurement system constructed in accordance with the principles of this invention.

In FIG. 2 there is illustrated an apparatus embodying the principles of this invention. A source of radiation 12 is positioned to emit radiation 13 incident upon a sample 11 which contains the specific element to be measured in a matrix of background materials. The source 12 may be a radioactive source emitting X-rays, an X-ray generator, a source of high energy electrons or a source of alpha particles of sufficient energy to excite the characteristic X-rays of the specific element to be measured. Excitation of this element will produce radiation 14 at the characteristic energy, some of which will be incident upon filter 21 which is held on a mounting 20 between the sample 11 and the detector 18. While the single filter 21 is illustrated, it will be understood that a pair of filters are employed, first one occupying the position shown as filter 21, and then a second one of a balanced pair occupying the same position in place of the first filter in sequence. The output of the detector 18 is electrically connected to a readout system 22. The detector 18 may be any suitable radiation detector sensitive to the radiation of the characteristic energy of the specific element being measured and producing electrical signals indicative of the quantity of radiation incident upon it.

In the practice of this invention, the detector may either be of the type which produces output signals having an amplitude related to the quantum energy of the incident radiation or may be of the type which produces output signals whose amplitude is independent of the quantum energy. Thus, of the former type, scintillation counters, proportional counters and solid state detectors may be used and the energy dependent amplitude may serve as the basis for discriminating against energies well outside of the characteristic energy band of the element being measured. In the latter type of detector, both solid state detectors and Geiger counters may be employed.

The readout system 22 contains a reversible counter, which can be operated so that pulses applied to it from the detector during the time radiation from the sample 11 is passed through the first filter causes the counter to count "up" and accumulate this total number of pulses for a specific time, $\tau$. The switch position may then be changed, so that with respect to the time when the detector is measuring the radiation passed through the second filter, the number of pulses produced by the detector during this measurement is subtracted from the first accumulated count and, the time for this second count is established as a fraction, F, of the time $\tau$, where F is selected to minimize the sensitivity of the system to variations in the composition of the mixture other than variations in the specific element being measured.

Figure 3:
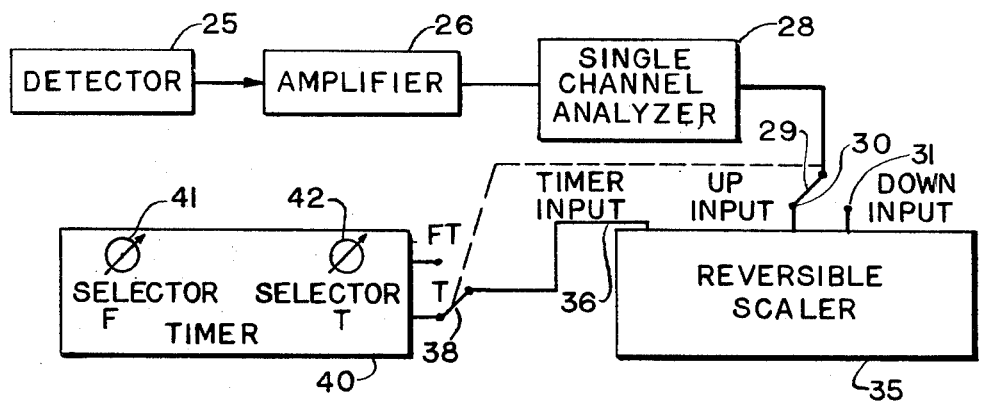
FIG. 3 is an illustration in block diagrammatic form of the detector, counting and timing system of an apparatus constructed in accordance with the principles of this invention.

A more detailed block diagram of the detector and readout system is illustrated in FIG. 3. In FIG. 3, the detector 25 provides an electrical output connection to amplifier 26, the output of which is in turn supplied to a single channel analyzer 28 and thence to the center arm 29 of a switch. The amplifier 26 is a conventional amplifier which in some instances linearly amplifies pulses from the detector 25. The single channel analyzer 28 serves the purpose of eliminating pulses attributable to radiation of energy widely different from that of the characteristic X-rays of the specific element being measured. In many instances this single channel analyzer 28 may be eliminated and amplifier 26 may be only a pulse amplifier. In general the analyzer 28 is a conventional instrument having upper and lower discriminator gates, thus passing only pulses having amplitudes between these fixed limits.

Reversible scaler 35 is a counting unit, as above indicated, having one input 30 designated "up" input and a second input 31 designated the "down" input. When the arm 29 of the switch connects the output from the single channel analyzer 28 to the up input the scaler 35 accumulates the number of pulses applied. When the arm 29 is, on the other hand, switched to connect to the down input 31, the number of pulses applied to the scaler are subtracted from the total already present. The timer 40 is shown connected through switch arm 38 to the timer input 36. The timer 40 includes both a selector control 41 for selecting the fraction F and a selector control 42 for selecting the time period $\tau$.

In practice, then, the control 42 allows a time $\tau$ to be selected which is the time for which the reversible scaler 35 accumulates pulses when switch 29 is in the position connecting to the up input. It should be noted that switch arm 29 and switch arm 38 are interconnected so that when arm 29 is connected to the up input switch arm 38 is connecting to the $\tau$ output from timer 40. Thus the control knob 42 selects the time period during which the reversible scaler will operate in the up direction. When the switch arm 29 is connected to down terminal 31 of reversible scaler 35, then the switch arm 38 is in turn connected to the $F\tau$ output from the timer 40 and the period for accumulation of pulses by the reversible scaler in the negative direction is then controlled by the setting of control selector 41 for F.

In operation the switch 29 is set in position to connect to terminal 30 while the first filter is in place during measurement and the switch 29 is switched to the down input 31 when the second filter is inserted in place in the measuring equipment. While the choice of scaler inputs and time is shown as a pair of switches and a separate time, it will of course be understood that a variety of circuit arrangements may be employed to generate this same result.

The circuitry shown operates on a digital basis to determine the difference between the number of rays detected while one filter was in place for time $\tau$ and the number detected for time $F\tau$ while the other filter was in place. The same computation may be done in analog fashion by connecting the output of the detector to a count rate meter type of circuit which is charged in one direction from the detector with one filter in place and then discharged while the other filter is in place. The time difference may be introduced, either as the time of charging or discharging, or by varying the conversion factor from the output of the detector to the charging device.

The determination of the value for the fraction F will depend upon the number of elements in the background matrix which emit radiation generally in the region of the characteristic radiation from the specific element being measured. As earlier discussed, electronic discrimination may be used to eliminate contributions from elements in the background matrix which emit radiation far removed in energy from the value of the characteristic X-ray of the specific element being measured.

A typical situation is that of the background matrix being formed principally of a single element, but also including a variable quantity of a second element emitting radiation generally in the region of the characteristic X-rays from the specific element being measured. In that situation a count for a time is made of a background matrix consisting of the principal background element with a small amount of the variable background element, first with one filter in place and then with the other filter in place. A second measurement is made with a background matrix containing a significantly greater quantity of the variable background element in addition to the principal element, again for a time $\tau$ with the first filter in place and for a time with the second filter in place. Both sets of background measurements are made for background materials which include substantially no quantity of the specific element to be measured. The appropriate value for F is then determined from the equation $$R_1 - Fr_1 = R_2 - Fr_2$$

or $$F = \frac{R_2 - R_1}{r_2 - r_1}$$

where $R_1$ and $r_1$ are the counts for time $\tau$ for the first described matrix with the first and second filters respectively; and $R_2$ and $r_2$ are the counts for time $\tau$ for the second described matrix with the first and second filters respectively.

When a specific element is to be measured in a background material which includes several elemental components emitting radiation falling within the electronic window of the system, it may be that the fraction F cannot be selected to reduce the contribution from these elements in the difference count to zero. However, the contribution from variation in these background elements may be minimized by requiring that the expression $$\Sigma [(R_i - F r_i) - \overline{(R_i - F r_i)}]^2$$

be a minimum.

For a series of N measurements F is then established as $$F = \frac{N \Sigma R_i r_i - \Sigma r_i \Sigma R_i}{N \Sigma r_i^2 - (\Sigma r_i)^2}$$

It will be apparent from the above discussion that the particular choice of balanced filters to be used for the quantitative measurement of a specific element is determined in the conventional manner for the choice of the balanced filters. However, the use of apparatus with the selectable time for the down counting provides for obtaining difference which, while maximally dependent upon the amount of characteristic radiation, at the same time minimizes any contribution to this value from variations in elements of the background matrix. Since this effects is achieved by the electronic counting and time selection, then the choice of filter elements themselves is not effected by the elemental composition of the background matrix and hence one pair of filters may be used for the determination of the quantity of a specific element, irrespective of the composition of the background matrix.

Figure 4:
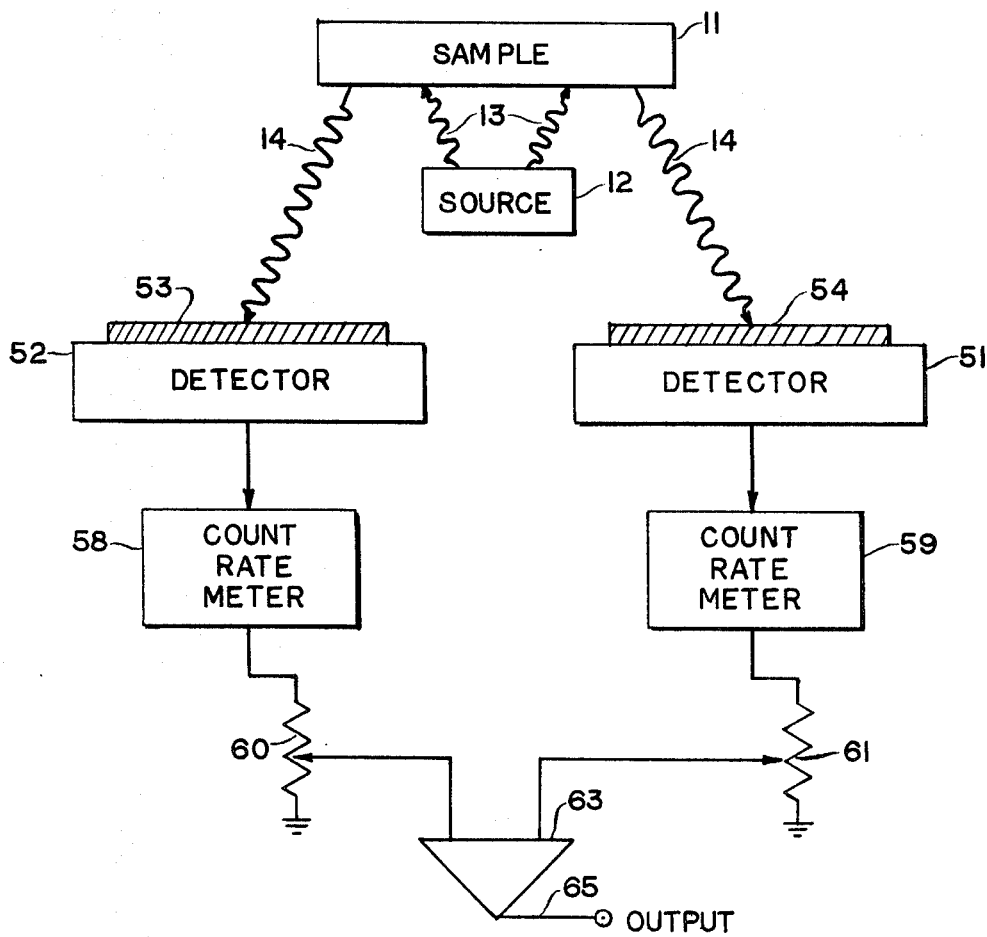
FIG. 4 is an illustration partially in block diagrammatic and partially in schematic form of a second embodiment of a measurement system constructed in accordance with the principles of this invention.

In FIG. 4 there is illustrated a system which includes a pair of detectors 51 and 52 with a filter 53 being interposed between the sample 11 and detector 52 and a filter 54 being interposed between the sample 11 and detector 51. In this system, there is a simultaneous measurement of the amounts of radiation transmitted through the filters 53 and 54 of the balanced pair. The output from detector 52 is connected to a count rate meter 58 and the output from detector 51 is connected to a second count rate meter 59. The count rate meter outputs are in turn connected across potentiometers 60 and 61 respectively. The moveable arms of potentiometers 60 and 61 are connected to the input terminals of a difference circuit, which is shown as a comparator amplifier 63, and the output signal of the apparatus appears on the output terminal 65 of this amplifier.

Again, in this system, a difference is to be taken between a signal representing the number of rays received by detector 52 for a time $\tau$ and a signal representing the number of rays received by detector 51 for a time $F\tau$. If the count rate meters 58 and 59 are set with the same sensitivity, then the output signals from these two count rate meters will represent the number of rays received by the corresponding detectors for equivalent times. However, by taking a different proportion of the signal from count rate meter 58 than is taken of the signal from count rate meter 59 and by applying these proportioned or weighted signals as the inputs to the difference circuit 63, a difference output signal is obtained which is equivalent to having measured the detector outputs for different times.

The weighted signals applied to the difference amplifier are then, in effect, signals representing the number of rays received by each detector for differing periods of time. The larger the fraction of the output signal from the count rate meter which is applied to the input of the difference circuit 63, the greater the equivalent measurement time and, conversely, a smaller fraction of the count rate meter output signal represents a smaller equivalent measurement time. The same effect may be accomplished by varying the sensitivity of the count rate meters and applying the full output signal from each count rate meter as the input to the different circuit. Thus, if the sensitivity of the count rate meter 58 were decreased with respect to the sensitivity of the count rate meter 59, this would be equivalent to measuring the radiation transmitted through filter 53 for a shorter period of time than the time of measurement for radiation passed through filter 54. Again, as in the previous mathematical expressions, the correct ratio for weighting these output signals is directly proportional to the ratio of $F\tau$ to $\tau$.

For simultaneous measurement, the embodiment shown has employed analog circuitry, however, methods for accomplishing this result digitally are known. In general, the digital approach involves the output from one detector being supplied directly to the up input terminal of a reversible scaler and also, through a controlled delay, to the down input of the scaler. The output from the other detector is supplied directly to the down output of the same scaler and, through a second controllable delay, to the up output of that scaler. Varying the periods of the controllable delays effectively varies the sensitivities to the two channels in the same sense that varying the sensitivity of the count rate meter does, that is, increasing the delay is equivalent to measuring the radiation received by the respective detector for an increased period of time.

Figure 5:
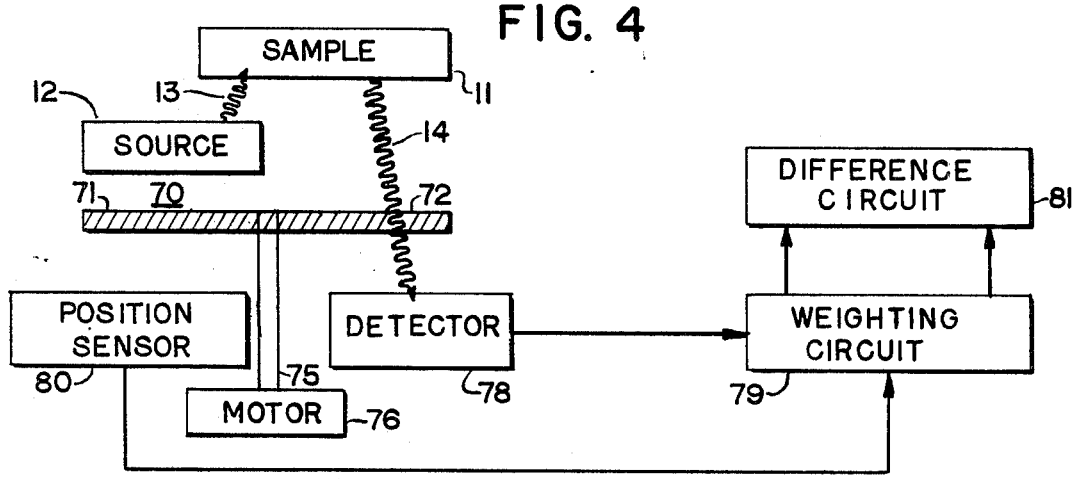
FIG. 5 is an illustration in block diagrammatic form of still another embodiment of a measurement system constructed in accordance with the principles of this invention.

In FIG. 5 there is illustrated still another apparatus for determining the specific quantity of an element with a pair of filters. In the embodiment of FIG. 5, a single detector 78 is used and a pair of filters 71 and 72 are formed into a disc 70. The disc is attached to a shaft 75 and the assembly is rotated at a constant velocity by motor 76. Thus, half of the radiation received by detectors 78 is transmitted through filter 71 and half through filter 72.

The output from detector 78 is connected to a weighting circuit 29, which provides two output signals to a difference circuit 81. A position sensor 80 also provides a signal to the weighting circuit 79. The position sensor 80 is arranged to cooperate with an identifying element on the disc 70 to provide to weighting circuit 79 a signal indicating when on of the filters is positioned over detector 78 rather than the other. This may be done, for example, by providing a transparent slit which runs coextensively with filter 71 and by positioning a light on one side of the disc and making position sensor 80 a photocell. Thus, the sensor 80 then provides a signal indicating when filter 71 is not over the detector 78.

Weighting circuit 79 may be any of several circuit arrangements, which include some switching means so that, when filter 72 is interposed between the sample 11 and the detector 78, signals from detector 78 will result in a corresponding weighted digital or analog signal appearing on one of the output leads from the weighting circuit 79 and, while filter 71 is over detector 78, the output signals from detector 78 will cause a corresponding weighted signal to appear on the other output lead from the weighting circuit. The difference circuit 81 may then be a conventional difference circuit, for example, a reversible scaler if the signals are digital or a comparator amplifier if the signals are analog. The weighting factor may be introduced in any of the ways previously described, for example, by adjusting the sensitivity of a count rate meter so that the analog output on one terminal represents a different sensitivity than the analog output on the other. Again, this weighting effect is the full equivalent of measuring the amount of radiation passed through the two filters for different times.

Having described the invention various modifications and improvements will now occur to those skilled in the art and the invention should be construed as limited only by the spirit and scope of the appended claims.

We claim:

1. Apparatus for determining the quantity of a specific element in a plurality of samples which include said specific element as one component of a background mixture which includes other known elemental components which may also vary in amount from sample to sample, comprising:

a source of radiation positioned to emit radiation onto said sample, said radiation having a quantum energy greater than the absorption edge of the specific element to be measured, a radiation detector sensitive to radiation over an energy range including the energy of the characteristic X-rays from said specific element, said detector being positioned to receive radiation emitted from said sample, first and second filters arranged to be sequentially interposed between said sample and said detector such that when said first filter is interposed said detector receives from said sample only radiation transmitted through said first filter and when said second filter is interposed said detector receives radiation transmitted through said second filter, said first and second filters being formed of materials such that the absorption edge of said first filter is lower in energy than said characteristic X-ray of the specific element and the absorption edge of said second filter is higher in energy than the characteristic X-ray of said specific element, means coupled to said detector for setting a first time period, $\tau$ and accumulating the number of rays received by said detector with said first filter in place for said first time period and for setting a second time period $F\tau$ and accumulating the number of rays received by said detector with said second filter in place for said second time period, where F differs from unity, and means for taking the difference between the number accumulated with said first filter in place and the number accumulated with said second filter in place as indicative of the quantity of the specific element in said composition, the time $F\tau$ being set such that variations in the composition of said mixture, other than variations in said specific element, effect a minimum contribution to said difference.

2. Apparatus for determining the quantity of a specific element in a plurality of samples which include said specific element as one component of a background mixture which includes other known elemental components which may also vary in amount from sample to sample, comprising, a source of radiation positioned to emit radiation onto said sample, said radiation having a quantum energy greater than the absorption edge of the specific element to be measured, first and second filters positioned to intercept radiation emitted from said sample in response to radiation from said source incident upon it, said first and second filters being formed of materials such that the absorption edge of said first filter is lower in energy than the characteristic X-rays from said specific element and the absorption edge of said second filter is higher in energy than the characteristic X-rays from said specific element, detector means for measuring the quantity of radiation transmitted through said first filter and the quantity of radiation transmitted through said second filter, said detector means including first and second detectors and wherein said first and second filters are positioned between said sample and said first and second detectors respectively, and means coupled to said detector means for taking the difference between a signal from said detector means proportional to the number of rays received by said detector means after transmission through said first filter during a period $\tau$ and a signal from said detector means proportional to the number of rays received by said detector means after transmission through said second filter for a time $F\tau$ where F differs from unity as indicative of the quantity of the specific element in said composition, the time $F\tau$ being set such that variations in the composition of said mixture, other than variations in said specific element, effect a minimum contribution to said difference, and wherein said detector means includes first and second count rate meters connected to the outputs of said first and second detectors respectively, said count rate meters having substantially identical sensitivities, a portion of the output of said first count rate meter being connected to one input of a difference circuit within said difference taking means and a portion of the output of said second count rate meter being coupled to a second input of said difference circuit, the ratio of said portion of the output from said first count rate meter to said portion of the output of said second count rate meter being adjusted to be equal to the ratio between $F\tau$ and $\tau$.

3. Apparatus for determining the quantity of a specific element in a plurality of samples which include said specific element as one component of a background mixture which includes other known elemental components which may also vary in amount from sample to sample, comprising, a source of radiation positioned to emit radiation onto said sample, said radiation having a quantum energy greater than the absorption edge of the specific element to be measured, first and second filters positioned to intercept radiation emitted from said sample in response to radiation from said source incident upon it, said first and second filters being formed of materials such that the absorption edge of said first filter is lower energy than the characteristic X-rays from said specific element and the absorption edge of said second filter is higher in energy than the characteristic X-rays from said specific element, detector means for measuring the quantity of radiation transmitted through said first filter and the quantity of radiation transmitted through said second filter, said detector means including first and second detectors and wherein said first and second filters are positioned between said sample and said first and second detectors respectively, and means coupled to said detector means for taking the difference between a signal from said detector means proportional to the number of rays received by said detector means after transmission through said first filter during a period $\tau$ and a signal from said detector means proportional to the number of rays received by said detector means after transmission through said second filter for a time $F\tau$ where F differs from unity, as indicative of the quantity of the specific element in said composition, the time $F\tau$ being set such that variations in the composition of said mixture, other than variations in said specific element, effect a minimum contribution to said difference and wherein said detector means includes first and second count rate meters connected to said first and second detectors respectively, the output from said first count rate meter being connected as one input to a difference taking circuit within said difference taking means and the output from the other of said count rate meters being connected to the other input of said difference circuit, the ratio of the sensitivity of said first count rate meter to the sensitivity of said second count rate meter being proportional to the ratio between $F\tau$ and $\tau$.

4. Apparatus for determining the quantity of a specific element in a plurality of samples which include said specific element as one component of a background mixture which includes other known elemental components which may also vary in amount from sample to sample, comprising, a source of radiation positioned to emit radiation onto said sample, said radiation having a quantum energy greater than the absorption edge of the specific element to be measured, first and second filters positioned to intercept radiation emitted from said sample in response to radiation from said source incident upon it, said first and second filters being formed of materials such that the absorption edge of said first filter is lower energy than the characteristic X-rays from said specific element and the absorption edge of said second filter is higher in energy than the characteristic X-rays from said specific element, detector means for measuring the quantity of radiation transmitted through said first filter and the quantity of radiation transmitted through said second filter, said detector means including a detector and means for sequentially inserting and reinserting said first and second filters between a sample and said detector at a predetermined frequency, and means coupled to said detector means for taking the difference between a signal from said detector means proportional to the number of rays received by said detector means after transmission through said first filter during a period $\tau$ and a signal from said detector means proportional to the number of rays received by said detector means after transmission through said second filter for a time $F\tau$ where F differs from unity, as indicative of the quantity of the specific element in said composition the time $F\tau$ being set such that variations in the composition of said mixture, other than variations in said specific element, effect a minimum contribution to said difference, and wherein said detector means includes weighting means coupled to said detector, to said means for inserting and reinserting said filters and to said difference taking means such that a weighting factor is applied to the detector output signal when said first filter is inserted between a sample and said detector said weighting factor being such that the ratio between the signal applied to said difference taking means when said first filter is inserted to that when said second filter is inserted is equal to the ratio between $F\tau$ and $\tau$.

PO-1050
(5/69)

UNITED STATES PATENT OFFICE
CERTIFICATE OF CORRECTION

Patent No. 3,581,087          Dated May 25, 1971

Inventor(s) Joris M. Brinkerhoff, Jean L. Hunerwadel and Francis B. Sellers

It is certified that error appears in the above-identified patent and that said Letters Patent are hereby corrected as shown below:

Column 3, line 11 reading through the filter and the number transmitted through the b should read through the a filter and the number transmitted through the b Column 3, lines 29-31 ments with filter a and measurements with filter b. pulses recorded for measurements with filter a and measurements with filter b.

should read ments with filter a and measurements with filter b.

Column 6, line 58 reading vide to weighting circuit 79 a signal indicating when on of the should read vide to weighting circuit 79 a signal indicating when one of the Signed and sealed this 12th day of October 1971.

(SEAL)
Attest:

EDWARD M. FLETCHER, JR.          ROBERT GOTTSCHALK
Attesting Officer          Acting Commissioner of Patents